Oct. 4, 1966 S. R. RICH 3,276,419
ELASTIC WAVE CONCENTRATOR
Filed June 16, 1965

INVENTOR
STANLEY R. RICH
BY
ATTORNEYS

3,276,419
ELASTIC WAVE CONCENTRATOR
Stanley R. Rich, West Hartford, Conn., assignor to Teknika, Inc., Auburn, Mass., a corporation of Delaware
Filed June 16, 1965, Ser. No. 464,273
6 Claims. (Cl. 116—137)

This invention relates to elastic wave generators and in particular to the housing surrounding the wave generating elements for directing and concentrating the elastic wave energy.

Elastic wave energy generators are used increasingly today for defoaming and removing gases from liquid. One form of elastic wave energy generator useful for this purpose is a whistle device in which gas under pressure is driven from a nozzle against a small resonant cavity to produce sonic or ultrasonic waves. Elastic wave energy generators of this type are more fully described in U.S. Patents 3,169,507 and 3,169,509.

Elastic wave energy breaks foam bubbles by rapid compression and decompression of the medium surrounding the bubble. As material forming the bubbles becomes tougher and more resilient the elastic wave intensity must be increased to extremely high levels. The wave generators employ directive housings called herein "concentrators" for providing a maximum intensity level in a localized volume. Even with concentrators for focusing the wave energy, intensity drops with distance so rapidly that where the wave generator is suspended in a tank it is necessary to place the wave generator in close proximity to the material being treated. The intensity of the elastic wave energy and other conditions are frequently such that the generator is exposed to a continuous mist or spray derived from rupture of foam bubbles and/or disturbance of the gas/liquid interface of the material under treatment.

In the treatment of material that tends to agglomerate, film or congeal readily, the elastic wave generators used for defoaming and degasing foul quickly due to the spray of substances from the material under treatment. After some study it became apparent that generator structures, of the type disclosed in the above cited patents, produced a gas flow pattern that contained a rarefied zone along the central axis of radiation. The rarefied zone attracts the spray of the material being treated so that it gradually works backward against the direction of flow of the exhaust driving fluid until the wave generating elements of the whistle become clogged. This is more fully explained in connection with FIG. 1 below.

In accordance with the present invention the applicant has found that by curving in the outer rim of the concentrator, he can set up a cross fire of exhausted driving fluid that acts as a screen or curtain tending to prevent mist or spray developed from the treated material from entering the rarefied zone in the axial front of the generator. Thus it is an object of the present invention to define concentrator means for an elastic wave generator.

It is a further object of the invention to define an antifouling concentrator for an elastic wave generator in a defoaming apparatus.

It is still a further object of the present invention to define an elastic wave generator together with means to drive it in defoaming apparatus so that fouling of the generator is eliminated.

Further objects and features of the invention will be understood upon reading the following description together with drawings in which:

FIG. 1 illustrates a prior art device which, when used to defoam or remove gas from liquids containing some types of coagulative or other gummy deposit forming material, fouls so as to be inoperative in a short time.

Figure 3:
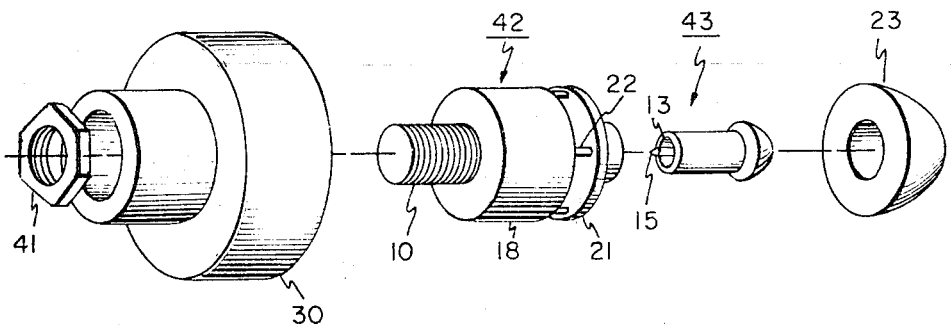
FIG. 3 is an exploded view of an elastic wave generator in accordance with the invention.
Figure 4:
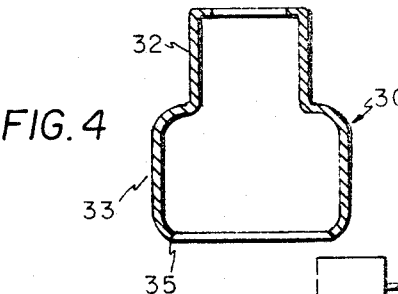
FIG. 4 is a cross-sectional view of a concentrator in accordance with the invention.

Exemplary liquids that cause this fouling problem include many paper-coating materials and polymer latices.

A feed pipe 10 introduces a drive fluid into the elastic wave generator generally designated 11. This drive fluid can be any fluid under pressure that is compatible with the particular use of the generator. That is the fluid should not contaminate or react undesirably with a material under treatment and should not create a hazardous condition, i.e. danger of fire or explosion. Air and/or steam are commonly preferred fluids.

The drive fluid enters generator 11 through nozzle 12 facing resonant cavity 13. Needle point 15 protruding toward nozzle 12 from the center of cavity 13 perturbs the steam or drive fluid so that elastic waves are set up at the resonant frequency of cavity 13.

Elastic waves and exhaust fluid pass out through radial channel 16 defined by concave face 17 of cylindrical body 18 and by convex face 20 of cylindrical body 21. Cylindrical body 21 is supported by standoff posts 22 to maintain the channel spacing between face 17 and face 20.

Cylindrical body 21 supports the cavity 13 and needle point 15 arrangement as well as a hemispherical shaped dome 23 facing the direction of energy propagation and serving to streamline the exterior of the whistle elements improving acoustic efficiency and reducing accumulation of foreign matter. Concentrator 25 surrounds the above described generator elements and defines an enlarged annular passage for directing generated elastic wave energy in a concentrated path extending in the axial line of the generator.

We are concerned here primarily with the passage and action of exhaust fluid leaving the generator. As is well known in fluid mechanics, a fluid moving in a passage will tend to hug a sidewall of the passage. The inner wall of concentrator 25 and the surface of cylindrical body 21 extending into the surface of hemispherical body 23 form such a passage. Exhaust fluid issuing from radial channel 16 preferentially hugs the inner wall of concentrator 25 as indicated by flow lines 26. The flow pattern formed by the exhaust fluid flowing outward from the wall of concentrator 25 produces relative rarefaction along the axis in front of dome 23. This rarefaction results in an inward flow toward dome 23 indicated by flow lines 27. This inward flow will normally include gas or mist ambient around the generator. Suspended liquid, or liquid that condenses on the surface of dome 23, creeps inward along the surface of dome 23 eventually reaching channel 16. Finally, if the liquid contains deposit-forming material, enough of this contamination collects to render the generator inoperative and it must be disassembled and cleaned before further operation.

Figure 1:
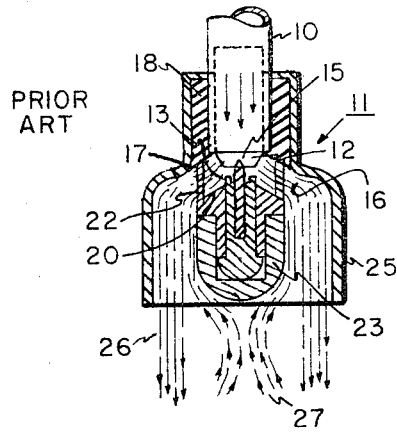
FIG. 1 is a cross-sectional view of a prior art device showing the condition that produces fouling.
Figure 2:
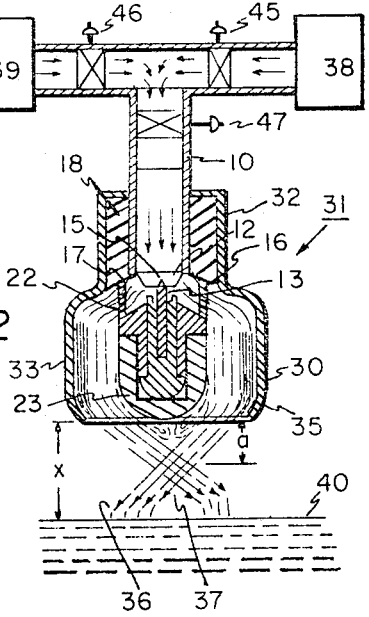
FIG. 2 is a similar cross-sectional view of an elastic wave generator equipped with an antifouling concentrator in accordance with the invention.

An elastic wave generator similar to that of FIG. 1 but utilizing a concentrator according to the present invention is illustrated in FIG. 2. Similar elements in FIG. 2 are numbered as in FIG. 1. FIG. 2 shows a concentrator 30 housing the wave generating elements of a generator 31 otherwise essentially identical to generator 11. Concentrator 30 comprises a first cylindrical section 32 which fits around cylindrical body 18 and a second relatively enlarged cylindrical section 33 with a wall spaced around the wave generating elements including hemispherical dome 23. A first end of cylindrical section 32 is adapted to be affixed to the inlet connection of generator 31. The second end of section 32 and the first end of section 33 are joined by an outwardly curving portion and the second or outlet end of section 33 terminates with inwardly curving lip 35.

As indicated by flow lines 36, exhaust fluid hugging the wall of concentrator 30 is directed inwardly by lip 35 so that fluid passing beyond lip 35 takes the pattern of a hollow cone. The apex 37 of this cone is located at some distance *"d"* (see FIG. 2) from the outlet end of concentrator 30 in the axial front of generator 31.

As in FIG. 1, the flow of the exhaust fluid moves outward from the wall of concentrator 30 leaving a relatively rarefied pressure zone immediately in front of dome 23. However, in generator 31 the inwardly curving lip of concentrator 30 causes the flow to converge forward of the rarefied zone. This convergence of the flow limits access of ambient mists and gases to the region of relative rarefaction. Thus the rarefied zone produces some recirculation of the exhaust fluid as illustrated in FIG. 2, with a greatly limited quantity of the mists and gases.

The driving fluid for the elastic wave generator 31 is supplied through inlet pipe 10 from pressurized sources 38 and 39. Valves 45, 46 and 47 regulate fluid flow from sources 38, 39 and in pipe 10 respectively. Source 38 is a source of air or other nondiluent gas and source 39 is a source of diluent fluid such as water mist or steam. The term "diluent" defines a material as having the quality to make thinner or more liquid by admixture. "Diluent" and "nondiluent" are used here in relation to the material the generator is intended to act on. For example, water or steam is a diluting agent with respect to a water suspension such as a latex.

It will be understood that generator fouling occurs when a material in suspension enters the wave generator and the suspending liquid evaporates. This leaves residual solids deposited in the generator which can build up and render the generator inoperative. Thus a diluent material as herein described would dilute the suspending liquid to maintain the suspension and prevent depositing out of solids.

Sources 38 and 39 may be pressure tanks, pumps or other suitable means of supplying gas or mist under pressure. For example source 39 may be a steam generator.

While air alone is suitable for some applications and for short runs, it has been found preferable to add a fluid that will dilute substances that pass through the curtain of exhaust fluid. For example, in removing residual monomer from a polymer latex, it has been found that water content in the exhaust fluid will dilute latex material that reaches the generator preventing it from drying so as to leave a deposit. While a water spray entrained with air for the drive fluid will serve this function, steam has been found more desirable for most purposes.

Steam can be controlled to add adequate heat to compensate for thermal loss by adiabatic expansion. When water is not a diluting agent for the material under treatment, some other diluent fluid that condenses at the exhaust end of the generator can be used.

It has been noted in monomer stripping that when some of the latex gets through and lands on hemispherical dome 23, that it immediately begins to creep up into the generator. When steam is used as drive fluid, the latex on dome 23 visibly dilutes to transparency, thins out and eventually is shaken from the dome surface out into the exhaust stream due to the sonic vibration. With only air driving the generator, the deposited latex dries and more is continually added to it in a gradual build up of latex on the generator elements.

The radius of curvature of lip 35 determines the distance *"d"* in FIG. 2. In any particular utilization this distance must be less than the distance *"x"* which is the distance between the lip of concentrator 30 and the surface of liquid body 40 being acted on. When the generator is positioned in a large chamber such as a centrifuge, it has been found preferable to position the wave generator in close proximity, i.e. 2 to 4 inches, to the liquid surface. Under these conditions it has been found that a radius of curvature for lip 35 is suitably in the range of ¼ to 1½ inches in a concentrator of about 1¾" inside diameter.

The extent to which lip 35 extends inwardly to the axis of the generator is limited by the need to maintain acoustical efficiency. Thus the total cross-sectional area of the outlet opening should not be reduced from the cross-sectional area defined between hemispherical body 23 and the sidewall of section 33 of the concentrator. The reduction in cross-section of body 23 toward the exhaust end of generator 31 permits some inward curving of lip 35 without constriction in the cross-sectional area of the outlet passage.

The following chart illustrates the improved operation of the present invention for degasing and defoaming polyvinyl acetate latex at 40% "solids." The transducer was positioned in a centrifuge 3 inches (distance *"x"*) from the vertical liquid surface. (Liquid surface vertical due to centrifugal action.)

| Concentrator | Driving Fluid | Fouling Time |
|---|---|---|
| Standard (Fig. 1) | Air at 80° F. | 3 hours. |
| Curved lip (Fig. 2) | Air at 80° F. | 8 hours. |
| Curved lip | Air at 80° F. and water spray. | 72 hours. |
| Curved lip | Steam | Did not foul. |

The curved-lip concentrator used above had a radius of curvature for the lip of about ⅜ inch. The maximum inside diameter of the concentrator was about 1¾ inches and the inside diameter measured at the lip edges was $1\frac{13}{32}$ inches.

FIG. 3 is an exploded view of generator 31 illustrated for a better understanding of the assembly. A threaded section of inlet pipe 10 together with the nozzle and radial channel assembly is generally designated assembly 42. Assembly 42 fits inside concentrator 30 which is fastened in place by nut 41 screwed down over pipe 10. Resonant chamber and needle assembly 43 fits into body 21 of assembly 42 and hemispherical dome 23 fits over resonant chamber and needle assembly 43.

FIG. 4 is a cross sectional view of novel concentrator 30 alone showing first cylindrical section 32, second enlarged cylindrical section 33 and inwardly curving lip 35.

While the invention has been described in relation to specific embodiments, it is intended that it be interpreted broadly within the spirit and scope of the appended claims.

What is claimed is:

1. A gas-driven elastic wave energy transducer comprising means to introduce gas under pressure, elastic wave generating means positioned in opposition to said means to introduce gas, a housing bisymmetrical about a longitudinal axis, a first end of said housing closed about said means to introduce gas, a second end of said housing open for radiation of wave energy and disposal of exhausted gas, an inner wall of said housing surrounding said generating means and providing a continuous path between said first end and said second end and a lip terminating said second end, said housing particularly characterized in that said lip curves inwardly so that a substantial portion of the gas exhaust from said transducer follows the inner wall of said housing and is directed by said lip so that it crosses the longitudinal axis of said housing at a point spaced beyond said second end.

2. A housing according to claim 1 in which said lip is curved so as to direct said exhaust to converge at a point within three inches of said open end.

3. In an elastic wave transducer of the type in which a fluid stream under pressure entering the transducer through an axial pipe is perturbed so that elastic waves are produced resonating at the frequency of a cavity opposing the orifice of said pipe and then guided by a concentrator designed to direct said elastic waves in a desired pattern, the combination in said concentrator comprising a cylindrical housing having a first end fastened to said pipe, said housing belling out in axial alignment with said pipe in the direction opposing said orifice toward a second outer end of said housing and having an inwardly curving lip at said outer end for directing the fluid exhaust issuing from said transducer along the inner wall of said housing so that it angularly converges on the central axis of said housing at a point spaced beyond said outer end.

4. An elastic wave transducer adapted to destroy foam and liberate gas comprising:
   (a) means to introduce a fluid stream under pressure;
   (b) means to perturb said stream so as to generate elastic waves;
   (c) an orifice for the passage of said waves and the exhaust of said stream from said transducer;
   (d) means to guide said elastic waves and the exhaust of said fluid stream in a concentrated annular pattern between said means to perturb and said orifice; and
   (e) an inwardly curving lip terminating said means to guide at said orifice for deflecting said exhaust of said fluid stream in an inwardly converging direction so as to form a curtain of exhaust fluid across the front of said orifice, said curtain having the pattern of a hollow cone with its apex projected to a point along an extension of the transducer axis in front of the transducer.

5. An elastic wave generator according to claim 4 in which said means to guide in a concentrated annular pattern comprises a concentrator surrounding said transducer and a body positioned inside said concentrator in the central axis of said transducer terminating in a rounded dome adjacent to said orifice and said means at said orifice for deflecting is an inwardly curving lip of said concentrator which coacts with the rounding of said dome so as to maintain an undiminished cross-sectional area between said means to perturb and said orifice.

6. An elastic wave generator adapted to destroy foam and liberate gas from a liquid body comprising:
   (a) means to introduce a drive fluid containing a diluting agent for said liquid under pressure;
   (b) means to perturb said fluid so as to generate elastic waves;
   (c) an orifice for the passage of said waves and the exhaust of said fluid from said generator;
   (d) means to guide said elastic waves and the exhaust of said fluid in a concentrated annular pattern between said means to perturb and said orifice; and
   (e) an inwardly curving lip terminating said means to guide at said orifice for deflecting said exhaust of said fluid in an inwardly converging direction so as to form a curtain of exhaust fluid across the front of said orifice.

References Cited by the Examiner

UNITED STATES PATENTS

| | | | |
|---|---|---|---|
| 1,727,861 | 9/1929 | Chapman | 116—137 X |
| 2,238,668 | 4/1941 | Wellenstein | 116—137 X |
| 2,369,020 | 2/1945 | Clark | 183—1 |
| 3,064,619 | 11/1962 | Fortman | 116—137 |
| 3,070,313 | 12/1962 | Fortman | 116—137 |
| 3,107,647 | 10/1963 | Soloff | 116—137 |
| 3,118,748 | 1/1964 | Hans-Jurgen et al. | 55—292 |
| 3,169,509 | 2/1965 | Rich | 116—137 |
| 3,169,561 | 2/1965 | Berger et al. | 141—69 |
| 3,182,710 | 5/1965 | Mount | 116—137 X |

LOUIS J. CAPOZI, *Primary Examiner.*